US012351389B2

(12) United States Patent
Costa Marques et al.

(10) Patent No.: US 12,351,389 B2
(45) Date of Patent: Jul. 8, 2025

(54) EXTENSION DEVICE FOR REFUSE CONTAINERS

(71) Applicants: Estevam Luiz Del Nero Costa Marques, Orlando, FL (US); Daniel Estevam Galdino Costa Marques, Orlando, FL (US)

(72) Inventors: Estevam Luiz Del Nero Costa Marques, Orlando, FL (US); Daniel Estevam Galdino Costa Marques, Orlando, FL (US)

( * ) Notice: Subject to any disclaimer, the term of this patent is extended or adjusted under 35 U.S.C. 154(b) by 339 days.

(21) Appl. No.: 17/876,236

(22) Filed: Jul. 28, 2022

(65) Prior Publication Data

US 2023/0119933 A1 Apr. 20, 2023

Related U.S. Application Data

(60) Provisional application No. 63/255,589, filed on Oct. 14, 2021.

(51) Int. Cl.
*B65F 1/14* (2006.01)

(52) U.S. Cl.
CPC ...... *B65F 1/1452* (2013.01); *B65F 2210/148* (2013.01)

(58) Field of Classification Search
CPC ..... B62B 5/06; B62B 2202/20; B65F 1/1468; B65F 1/1473; B65F 1/1452; B65F 2210/148; B65D 25/28
See application file for complete search history.

(56) References Cited

U.S. PATENT DOCUMENTS

| | | | | |
|---|---|---|---|---|
| 3,380,752 | A | 4/1968 | Goettl et al. | |
| 3,585,781 | A | 6/1971 | Blee | |
| 4,609,200 | A * | 9/1986 | Winter | B62B 5/02 280/5.2 |
| 4,807,916 | A | 2/1989 | Erickson | |
| 6,309,167 | B1 | 10/2001 | Pherrin | |
| 8,251,248 | B1 | 8/2012 | Holmes | |
| 8,453,872 | B1 * | 6/2013 | Holmes | B65F 1/1473 220/759 |

(Continued)

FOREIGN PATENT DOCUMENTS

| | | |
|---|---|---|
| DE | 202007016928 | 3/2008 |
| EP | 1183196 B1 | 11/2002 |
| WO | 2008083425 A1 | 7/2008 |

*Primary Examiner* — Andrew T Kirsch
(74) *Attorney, Agent, or Firm* — Jason T. Daniel, Esq.; Daniel Law Offices, P.A.

(57) ABSTRACT

An extension device for a refuse container includes a central frame section having a pair of upper frame arms, a pair of lower frame arms and a pair of articulating frame arms. The frame section includes a shape and a size that designed to be compatible with commercial grade refuse containers. An extendable handle section is connected to the pair of upper frame arms, a pair of extendable support legs are connected to the pair of lower frame members, and a pair of extendable lid securement arms are connected to the pair of articulating frame arms and secure the lid of the refuse container in the closed position. Locking tabs located along the pair of lower frame arms secure the device onto the refuse container. The device transitions between a fully extended position for engagement with the refuse container and a fully collapsed position for storage.

11 Claims, 9 Drawing Sheets

(56) References Cited

U.S. PATENT DOCUMENTS

| | | | |
|---|---|---|---|
| 9,150,066 | B1 | 10/2015 | Cooper |
| 2005/0145637 | A1 | 7/2005 | Lin |
| 2010/0078233 | A1 | 4/2010 | Fletcher et al. |
| 2014/0246439 | A1 | 9/2014 | Friedman |

* cited by examiner

EXTENSION DEVICE FOR REFUSE CONTAINERS

CROSS-REFERENCE TO RELATED APPLICATIONS

This application claims the benefit of U.S. Application Ser. No. 63/255,589 filed on Oct. 14, 2021, the contents of which are incorporated herein by reference.

TECHNICAL FIELD

The present invention relates generally to waste management products, and more particularly to an extension device for refuse containers.

BACKGROUND

The statements in this section merely provide background information related to the present disclosure and may not constitute prior art.

In recent years, many municipalities have begun mandating the use of specific refuse containers for residential and commercial waste. In many instances, the containers are provided by the local agency responsible for garbage collection and are specifically chosen to be suitable for use with automated side-loading arms that are secured onto modern collection vehicles.

In order to reduce the number of visits, and therefore the costs involved in waste collection efforts, these refuse containers are typically large-wheeled bins having a hinged lid and a capacity of between 60 and 96 gallons. Although useful for receiving and storing large amounts of waste, these containers suffer from many practical drawbacks for residents who must use them every day.

For example, due to the large size and weight of the containers, many users have a difficult time transitioning the container onto its wheels and then physically pushing or pulling the container to the curb. This is particularly difficult due to the close proximity of the handle to the side of the container, as the handle also functions as the support for the hinged lid mechanism. Additionally, it is not uncommon for water, dirt and other grime to accumulate along the top surface of the lid between uses. In many instances, a user does not notice these materials until they attempt to move the container at which time the water and other grime are unceremoniously splashed onto their legs or clothing.

Moreover, because these containers are not emptied for several days at a time, it is not uncommon for animals to access the interior of the container and/or for the container to become knocked over. Either of these instances typically results in the stored trash being strewn about the yard and necessitating a messy cleanup by the homeowner or resident.

Accordingly, it would be beneficial to provide an extension device for refuse containers that can be quickly and easily secured onto a container in order to overcome each of the drawbacks noted above.

SUMMARY OF THE INVENTION

The present invention is directed to an extension device for a refuse container. One embodiment of the present invention can include a central frame section having a pair of upper frame arms, a pair of lower frame arms and a pair of articulating frame arms. The frame section can include a shape and a size that is specifically designed to be compatible with commercial grade refuse containers, and particularly for use with refuse containers manufactured for use with automated side or front load collection vehicles.

In one embodiment, the device can include a handle section that is connected to the pair of upper frame arms. The handle section can provide a gripping surface for a user and can provide separation distance between the user and the container. The vertical support legs can extend downward from the frame and can work in conjunction with the handle to provide a mechanical advantage when tilting and/or moving the refuse container.

In one embodiment, the device can include a lid securement section that is connected to the pair of articulating frame arms. The lid securement section can function to secure the lid in the closed position regardless of whether the refuse container is standing upright or has been knocked over. The device can also include a pair of locking tabs which can function to secure the device onto the refuse container.

In one embodiment, the device can transition between a fully extended position for engagement with the refuse container and a fully collapsed position for storage.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
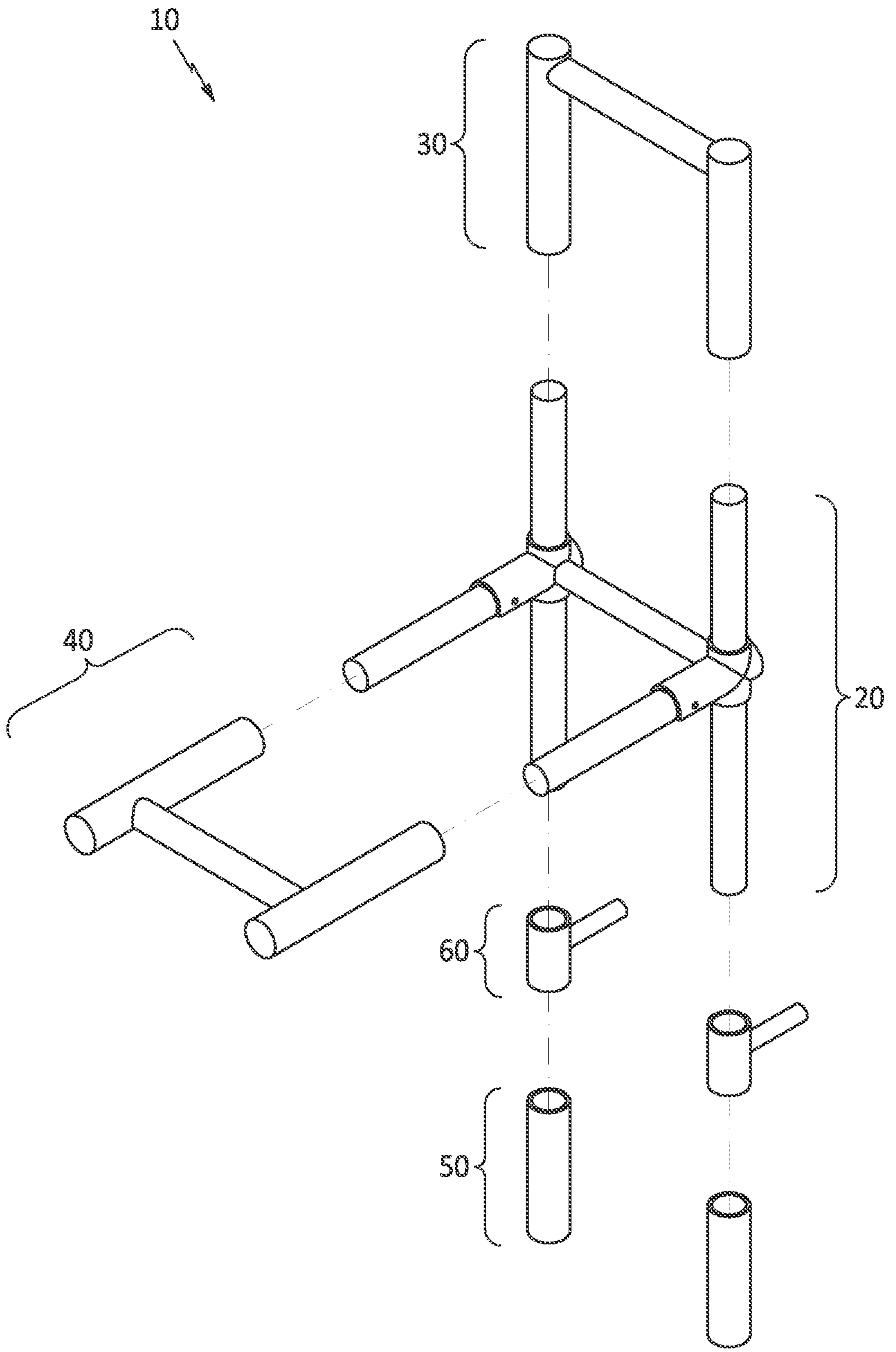
FIG. 1 is an exploded parts view of an extension device for refuse containers that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" means a series of identified physical components which are linked together and/or function together to perform a specified function.

As described throughout this document, the term "about" "approximately" "substantially" and "generally" shall be used interchangeably to describe a feature, shape, or measurement of a component within a tolerance such as, for example, manufacturing tolerances, measurement tolerances or the like.

As described herein, the term "slidingly engage", "telescopically connected" and derivatives thereof shall be used interchangeably to describe a situation wherein two identified objects are connected linearly such that one identified part slides into and out from the other identified part so as to selectively lengthen or shorten the total linear length of both parts.

As described herein, the term "removably secured," and derivatives thereof shall be used to describe a situation wherein two or more objects are joined together in a non-permanent manner so as to allow the same objects to be repeatedly joined and separated.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

As described herein, the term "connector" includes any number of different elements that work alone or together to repeatedly join two items together in a nonpermanent manner. Several nonlimiting examples of connectors include, but are not limited to, thread-to-connect, twist-to-connect, and push-to-connect type devices, opposing strips of hook and loop material (e.g., Velcro®), attractively oriented magnetic elements or magnetic and metallic elements, buckles such as side release buckles, clamps, sockets, clips, carabiners, and compression fittings such as T-handle rubber draw latches, hooks, snaps and buttons, for example. Each illustrated connector and complementary connector can be permanently secured to the illustrated portion of the device via a permanent sealer such as glue, adhesive tape, or stitching, for example.

FIGS. 1-8 illustrate one embodiment of an extension device for refuse containers 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

FIG. 1 is an exploded parts view of the device 10, in accordance with one embodiment. As shown, the device can include, essentially, a central frame section 20 that is connected to a handle section 30, a lid securement section 40, a vertical support section 50, and a locking section 60.

Although illustrated below with regard to a specific refuse container such as the ULINE® 95-gallon commercial trash can, the inventive concepts are not to be construed as limiting to any particular type or manufacture of refuse containers. Indeed, due to the requirements imposed by automated side load collection vehicles, the inventive extension device includes a shape and a size that is compatible with virtually any such refuse container having a container body, a container handle and a lid having a hinge mechanism within or along the container body.

Figure 2A:
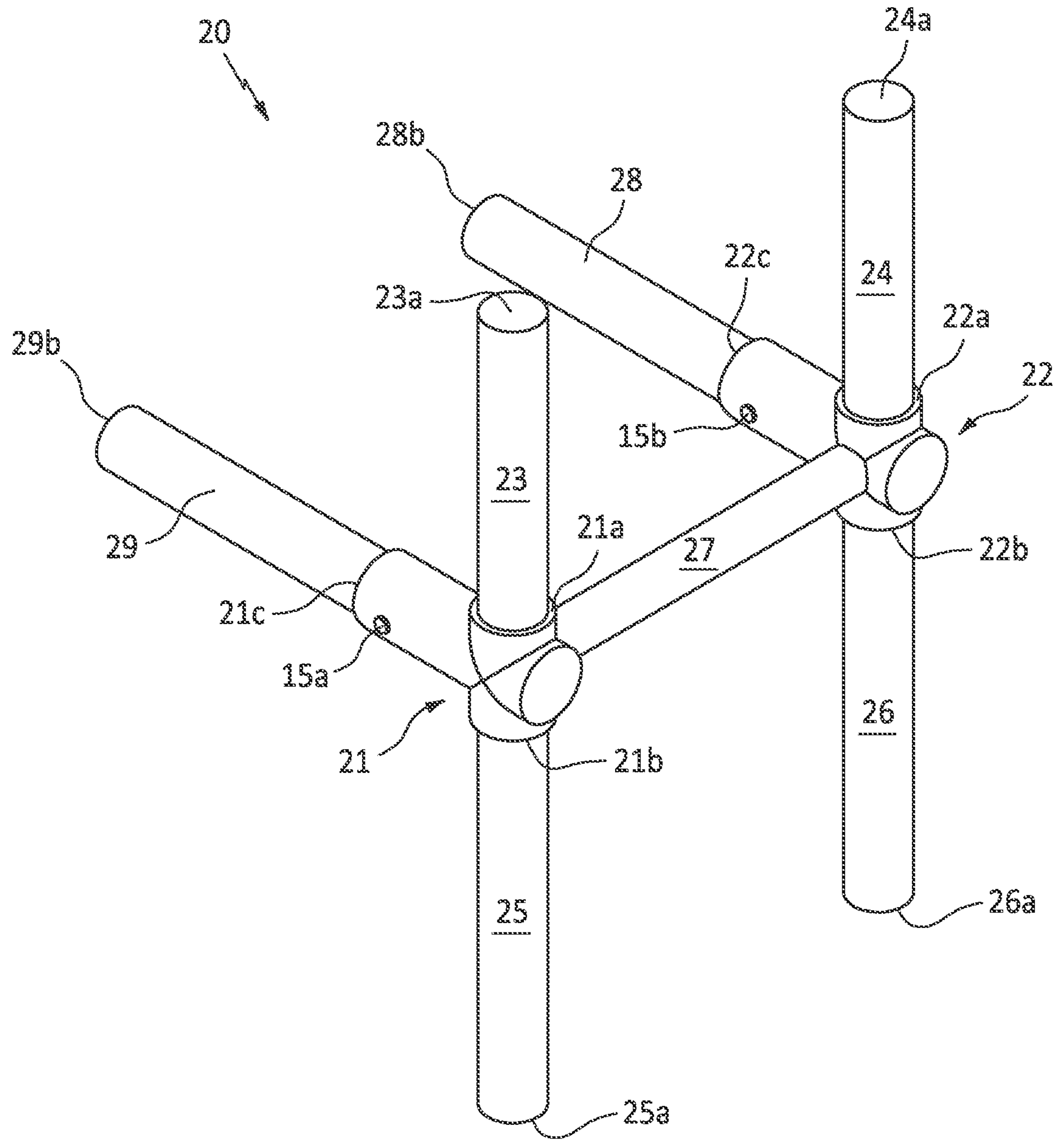
FIG. 2A is a cutout view of the central frame section of the extension device for refuse containers in accordance with one embodiment of the invention.
Figure 2B:
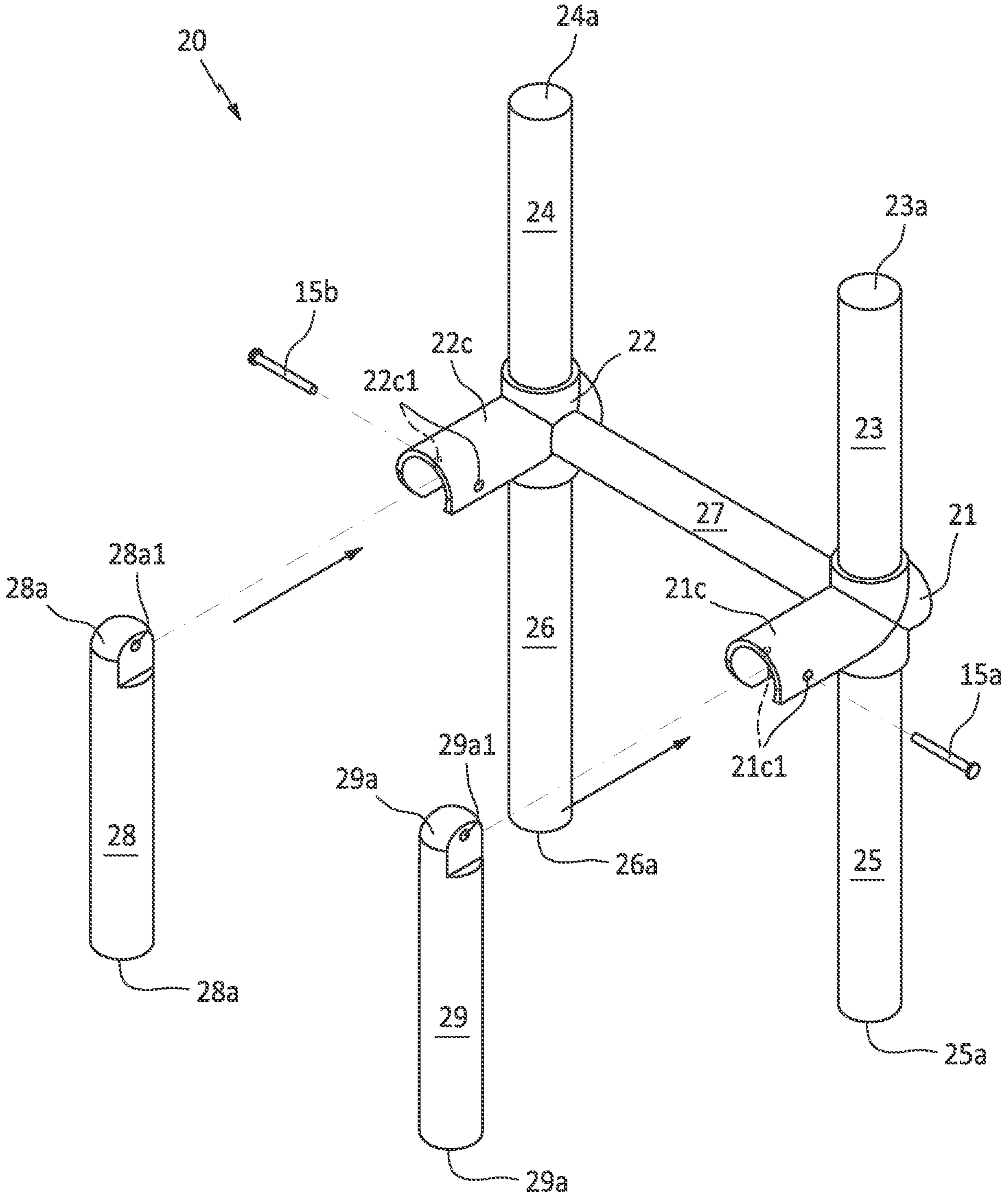
FIG. 2B is another cutout view of the central frame section of the extension device for refuse containers in accordance with one embodiment of the invention.

As shown best at FIGS. 2A and 2B, one embodiment of the central frame section 20 can include a pair of Tee couplers 21 and 22, each having a top opening 21*a*, 22*a*, a bottom opening 21*b*, 22*b*, and a middle opening 21*c*, 22*c*, extending outward therefrom. A pair of upper frame arms 23 and 24 can be provided. Each of the upper frame arms having bottom ends that are positioned within openings 21*a* and 22*a*, respectively, and upper ends 23*a* and 24*a* that extend away from the couplers.

In one embodiment, the pair of lower frame arms 25 and 26 can be provided. Each of the lower frame arms having upper ends that are positioned within bottom openings 21*b* and 22*b*, respectively, and lower ends 25*a* and 26*a* that extend away from the couplers.

In one embodiment, the couplers are joined together by a horizontal support bar 27 that is positioned between the sides of the couplers so as to secure the couplers in a parallel orientation. Although described as discrete components, other embodiments are contemplated wherein each of the components 21-27 are constructed as a single element through known manufacturing processes.

In one embodiment, the middle openings 21*c* and 22*c*, can be semicircular in nature, having open bottom ends, and can further include a pair of apertures 21*c*1 and 22*c*1, respectively along the sides of the semicircular body. As shown, a pair of articulating arms 28 and 29 can be provided. Each of the articulating arms having a rounded top end 28*a* and 29*a*, and bottom ends 28*b* and 29*b* that extend away from the couplers.

When the rounded top ends of the articulating arms 28*a* and 29*a* are positioned through the semicircular openings, apertures 21*c*1 are aligned with aperture 29*a*1, and apertures 22*c*1 are aligned with aperture 28*a*1, respectively, so as to be engaged by fasteners 15*a* and 15*b* such as the illustrated bolts, for example. In this regard, each of the arms 28 and 29 can rotate (see arrow d at FIG. 4) between a folded position wherein they are positioned parallel to the lower frame arms 25 and 26, and an unfolded position wherein the articulating arms are positioned perpendicular to the lower frame arms.

Although described above with regard to a particular type of fastener and arrangement of components, this is for illustrative purposes only, as any number of other types of fasteners or arrangement of components can be utilized to permit the arms 28 and 29 to move between the folded and unfolded positions.

In the preferred embodiment, each of the components 21-29 can preferably be constructed from hollow PVC plastic, so as to be lightweight, waterproof and strong for their weight. However, any number of other materials such as various metals, different plastics and/or composite materials may be utilized.

Figure 3:
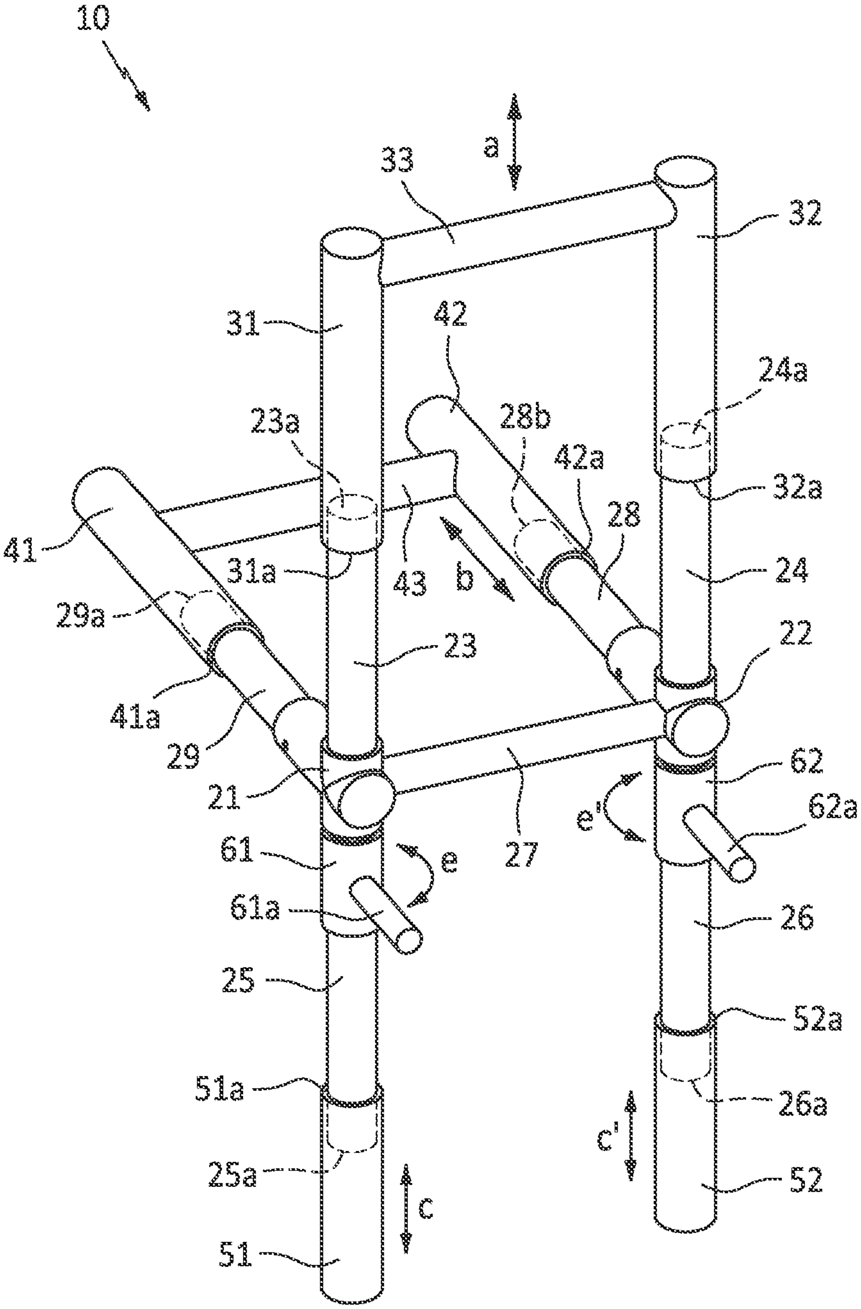
FIG. 3 is a perspective view of the extension device for refuse container in the fully extended position, in accordance with one embodiment of the invention.
Figure 4:
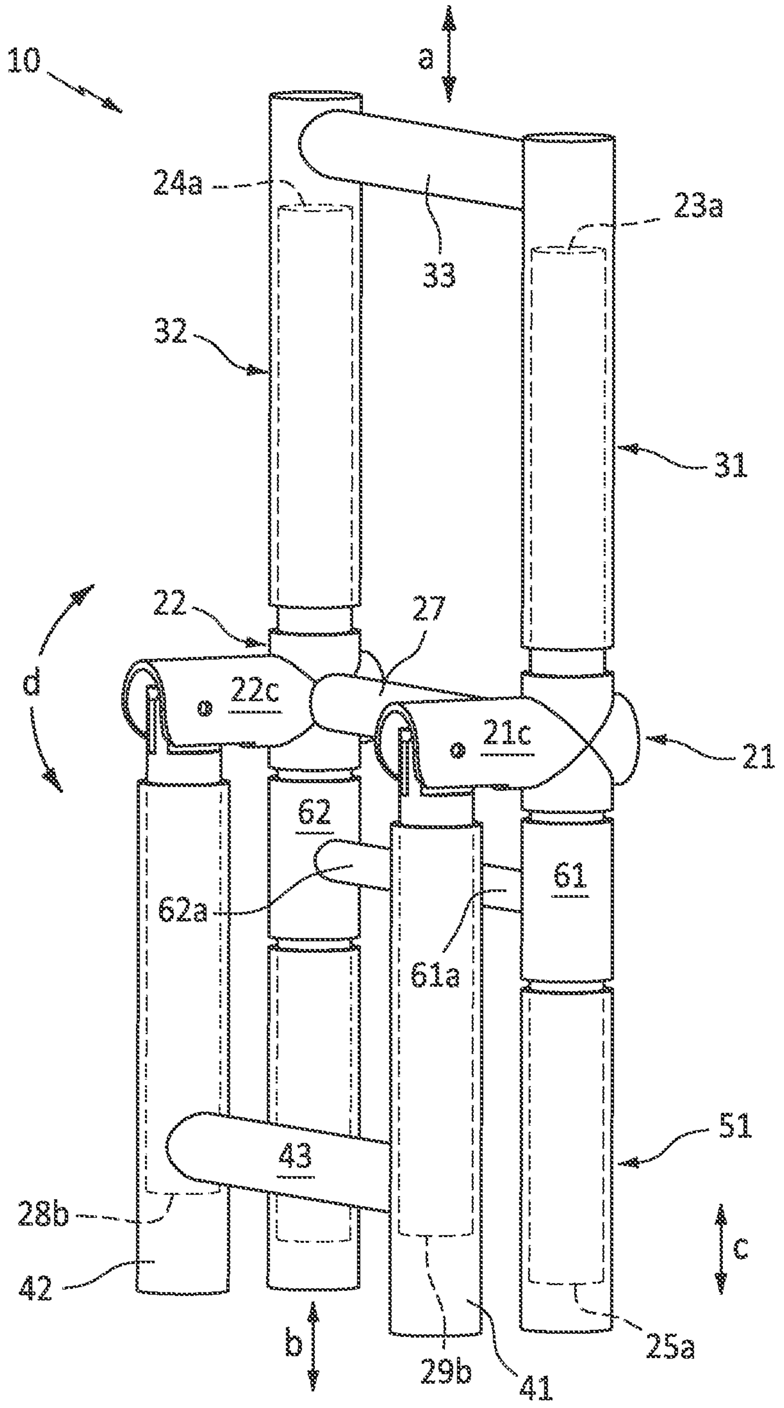
FIG. 4 is a perspective view of the extension device for refuse container in the fully collapsed position, in accordance with one embodiment of the invention.

FIGS. 3 and 4 illustrate one embodiment of the device 10 in the fully extended position for use with a refuse container, and a fully collapsed position as would be used when storing the device. As shown, the handle section can include a generally inverted U-shaped member having two vertical handle arms 31 and 32 that are connected along their top ends by a horizontal handle arm 33. In the preferred embodiment, the handle arms can be hollow, and can include openings along the respective bottom ends 31*a* and 32*a* into which frame ends 23*a* and 24*a* are slidingly positioned.

As shown by arrow a, the handle can move telescopically along the length of the arms 23 and 24 so as to retract toward the tee couplers and extend away from the tee couplers, respectively. In various embodiments, a tensioning ring can be provided along each of the arms to allow a user to secure the handle at a user defined height. As will be described below, such a feature allows a user to adjust the height of the handle when manipulating a refuse container, thus providing an adjustable amount of leverage and a mechanical advantage.

Although described above with regard to a particular shape or size, this is for illustrative purposes only. As such, the handle section can include any number of different shapes and components and may be connected to the central frame in either a fixed or telescopic nature.

The lid securement section can function to engage and secure the lid of a refuse container in the closed position. As shown, the lid securement section can include a generally H-shaped member having two elongated parallel arms 41 and 42 that are connected together by a third arm 43. In the preferred embodiment, the securement arms can be hollow, and can include openings along one end 41*a* and 42*a* into which the distal ends 29*b* and 28*b* of the articulating frame arms are slidingly positioned.

As shown by arrow b, the lid securement arms can move telescopically along the length of the arms 28 and 29 so as to retract toward the tee couplers and extend away from the tee couplers, respectively. In various embodiments, a tensioning ring can be provided along each of the arms to allow a user to secure the securement arms at a user defined length. As will be described below, such a feature allows a user to adjust the length of the arms to extend across the entire top surface of a refuse container lid, so as to prevent the lid from opening.

Although described above with regard to a particular shape or size, this is for illustrative purposes only. As such, the securement arms can include any number of different shapes and components and may be connected to the central frame in either a fixed or telescopic nature.

The vertical support section can function to engage the back surface of a refuse container and can function in harmony with the handle to provide a user with a mechanical advantage for tilting and moving the container to which the device is secured. In the preferred embodiment, two elongated parallel legs 51 and 22 can be provided. Each of the legs can be hollow and can include openings along one end 51*a* and 52*a* into which the distal ends 26*a* and 25*a* of the lower frame arms are slidingly positioned.

As shown by arrows c and c', each of the support legs can move telescopically along the length of the arms 25 and 26 so as to retract toward the tee couplers and extend away from the tee couplers, respectively. In various embodiments, a tensioning ring can be provided along each of the arms to allow a user to secure the securement arms at a user defined length. As will be described below, such a feature allows a user to adjust the length of the arms to extend across the entire top surface of a refuse container lid, so as to prevent the lid from opening.

As further shown by arrow d, the above-described articulating frame arms 28 and 29 transition between a folded and unfolded state. As such, the support legs 41 and 42 rotate with the frame arms.

Although described above with regard to a particular shape or size, this is for illustrative purposes only. As such, the support legs can include any number of different shapes and components and may be connected to the central frame in either a fixed or telescopic nature.

The locking section can function to secure the device 10 onto a refuse container in the manner described below. In the preferred embodiment, two distinct locking tabs 61 and 62 can be provided. As shown, each of the locking tabs 61 and 62 can include a generally hollow tubular member through which the portion of the lower frame arms 25 and 26 are located.

In the preferred embodiment, the locking tabs can be positioned along the upper ends of the lower frame arms at a location adjacent to the tee couplers 21 and 22, respectively. In one embodiment, each of the locking tabs can also include protrusions 61*a* and 62*a* that extend outward from the main body in a direction perpendicular to the respective lower frame arms.

As shown by arrows e and e', each of the locking tabs can independently rotate/twist horizontally, so as to transition between a locked state (FIG. 3) wherein the protrusions extend perpendicular to the horizontal support bar 27, and an unlocked state (FIG. 4) wherein the protrusions extend parallel to the horizontal support bar 27. As will be described below, in the locked state the tabs can engage the bottom surface of a refuse container handle, so as to prevent removal of the device.

Although described above with regard to a particular number shape or sized locking tab, this is for illustrative purposes only. As such, the device can include a greater or lesser number of locking tabs, each having any number of different shapes and components, so as to be suitable for removably securing the device 10 onto a refuse container.

Although described above with regard to a first component that is positioned within a second component in order to achieve the telescopic movement, those of skill in the art will recognize that the respective components can be reversed such that the second component can be positioned within the first component to achieve the same telescopic movement. As such, the device is not to be construed as limiting to the illustrated embodiments.

Figure 5:
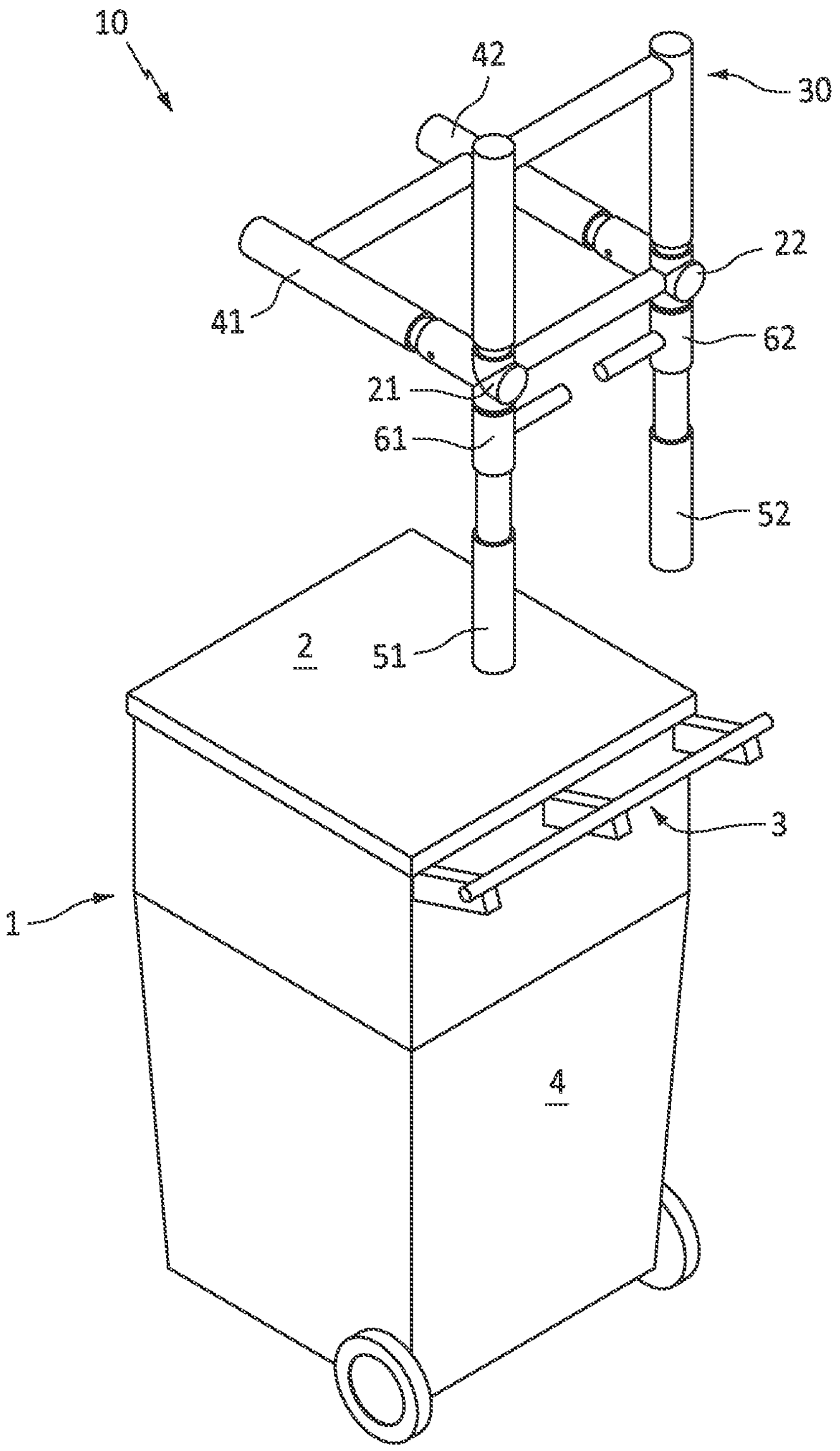
FIG. 5 is a perspective view of the extension device for refuse container in operation, in accordance with one embodiment of the invention.

FIGS. 5-8 illustrate one embodiment of the device 10 in operation with a refuse container 1. As shown at FIG. 5, the device can be positioned above the refuse container such that the lid securement arms 41 and 42 are above the refuse container lid 2, the locking tabs 61 and 62 are in the unlocked position, and the lower support legs 51 and 52 are positioned above the opening between the refuse handle 3 and the back wall 4 of the container body.

Figure 6:
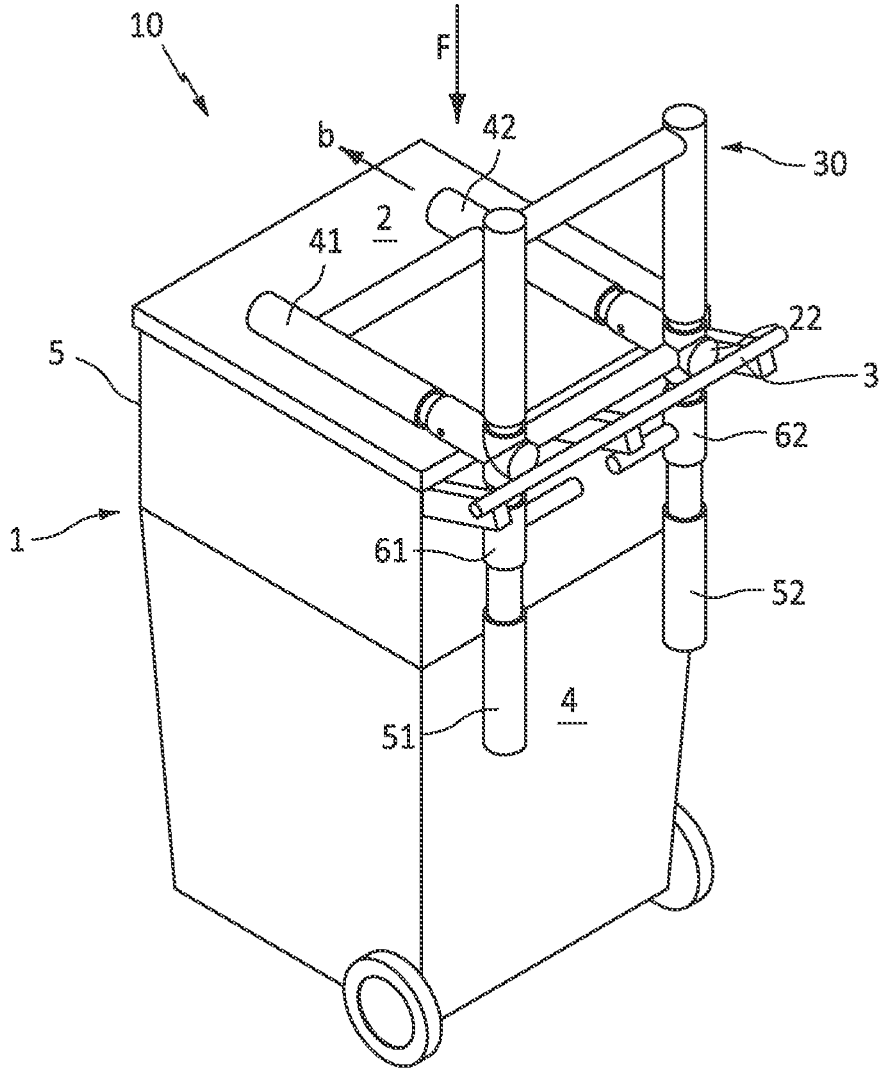
FIG. 6 is another perspective view of the extension device for refuse container in operation, in accordance with one embodiment of the invention.

As shown at FIG. 6, the device can be lowered (see arrow F) until the lid securement arms 41 and 42 are resting atop the lid 2, the lower support legs 51 and 52 are positioned against the back wall of the container body, and the locking tabs are positioned beneath the handle 3. At this time, the securement arms 41 and 42 can be extended (arrow b) toward the front wall 5 of the refuse container in order to secure the lid in the closed position.

Figure 7:
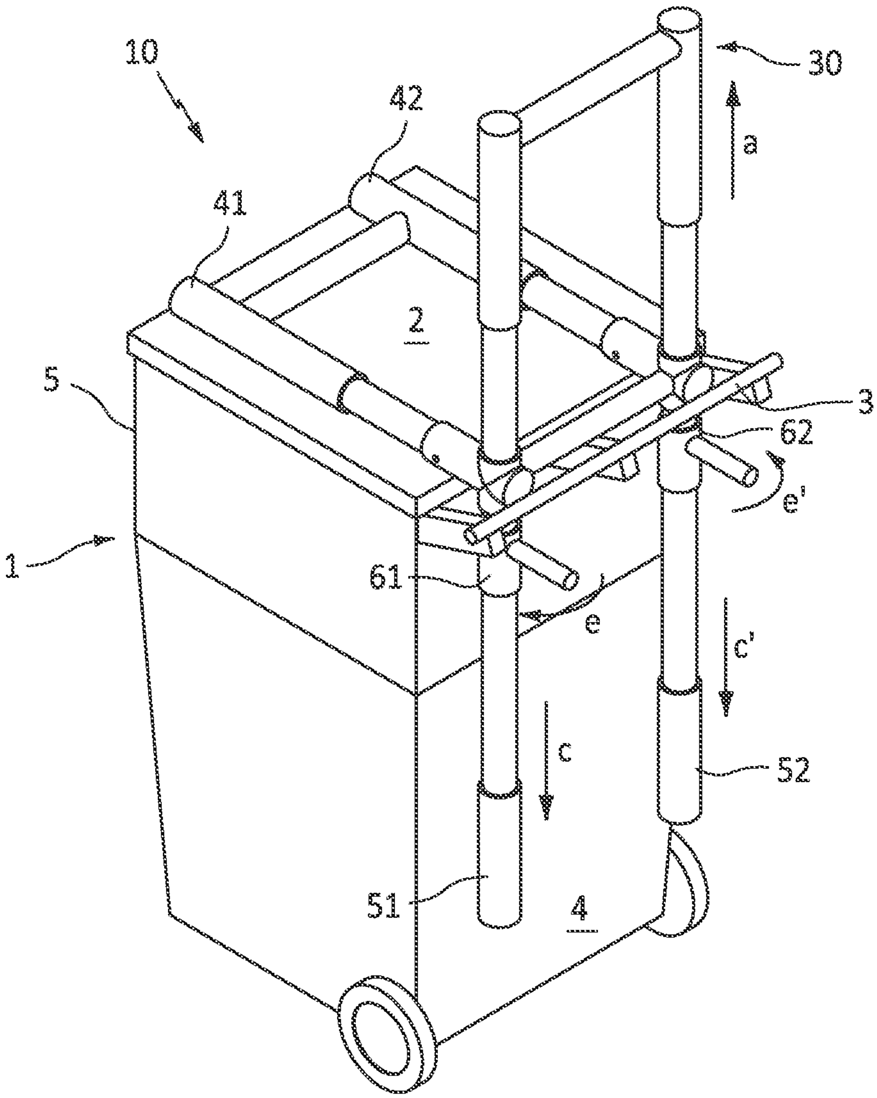
FIG. 7 is a perspective view of the extension device for refuse container in operation, in accordance with one embodiment of the invention.

As shown at FIG. 7, the support legs 51 and 52 can be extended (arrows c and c') toward the bottom end of the back wall 4, the locking tabs 61 and 62 can be rotated (arrows e and e') to the locked position, and the device handle 30 can be raised (arrow a) to a user preferred height.

Figure 8:
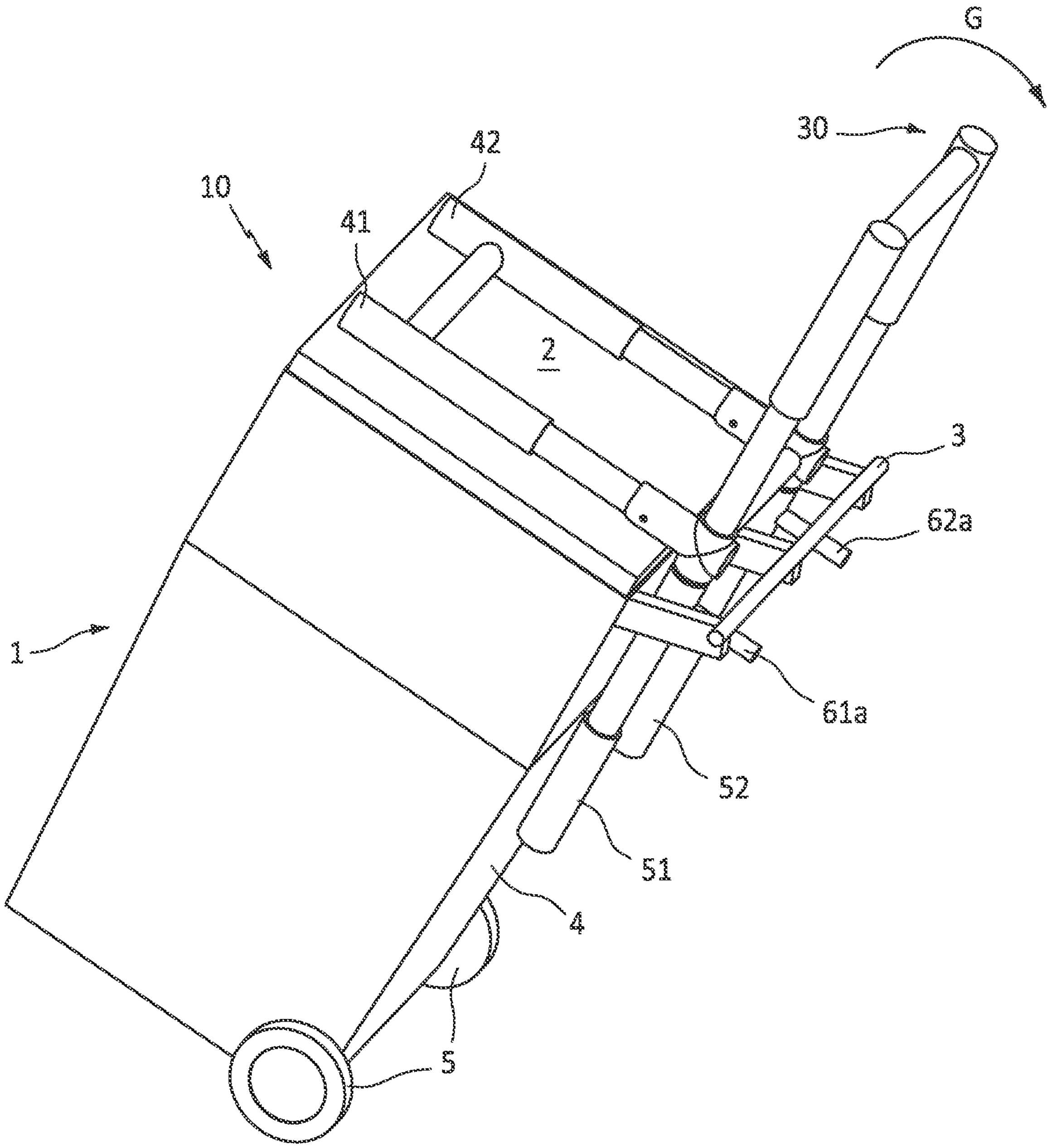
FIG. 8 is a perspective view of the extension device for refuse container in operation, in accordance with one embodiment of the invention.

As shown at FIG. 8, when so positioned, the user can grasp and pull the handle 30 to rotate (see arrow G) the container 1 onto its wheels 5 and can further push or pull the container in any desired direction. In this regard, the protrusions 61*a* and 62*a* of the locking tabs engage the bottom surface of the container handle 3 to prevent the device 10 from moving relative to the container.

As would be apparent to those of skill in the art, the use of an elongated handle extending above the lid of the container, and the elongated support legs 51 and 52 extending along the back wall of the container provides the user with physical leverage and mechanical advantage that allows the user to tilt and move the container with ease, even when the container is filled to the maximum capacity. Moreover, the handle 30 provides physical separation distance between the container and the user such that any liquids or other such debris that has accumulate along the lid 2 of the container does not make contact with the user during the tilting procedure.

Finally, when the device is secured onto the container in the manner described herein, the securement arms 41 and 42 function as a physical barrier for preventing the lid 2 of the container from being opened. Such a feature being particularly advantageous for preventing animals from accessing the container and/or for preventing the container contents from spilling out of the container in the event the container falls or is knocked over.

As described herein, one or more elements of the extension device for refuse containers 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the terms "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. An extension device for a refuse container, said device comprising:

a central frame section having a pair of upper frame arms, a pair of lower frame arms and a pair of articulating frame arms, said central frame section being configured to position the articulating frame arms onto a lid of a refuse container, and to position the lower frame arms against a back wall of the refuse container;

a handle section that is connected to the pair of upper frame arms;

a lid securement section that is connected to the pair of articulating frame arms, said lid securement section including a U-shaped member that is configured to transition between a retracted position and an extended position;

a locking section that is connected to an upper portion of the lower frame arms; and a vertical support section that is connected to a lower portion of the lower frame arms, wherein each of the pair of articulating frame arms are configured to rotate the lid securement section between a folded position and an unfolded position, and the lid securement section is configured to extend across an entire length of the lid and to prevent the lid from opening when the articulating frame arms are in the unfolded position and the lid securement section is in the extended position.

2. The device of claim 1, wherein the handle section is configured to transition between a retracted position and an extended position.

3. The device of claim 2, wherein in the extended position, the handle section extends out from an upper end of the upper frame arms and is positioned above the back wall of the refuse container for providing a mechanical advantage in moving the refuse container.

4. The device of claim 1, wherein the vertical support section is configured to transition between a retracted position and an extended position.

5. The device of claim 4, wherein in the extended position, the vertical support member extends out from a lower end of the lower frame arms and is positioned adjacent to a bottom surface of the refuse container along the back wall.

6. The device of claim 1, wherein the locking section is configured to transition between a locked position and an unlocked position.

7. The device of claim 6, wherein in the unlocked position the device is configured to move relative to the refuse container.

8. The device of claim 6, wherein in the locked position, the device is locked onto the refuse container.

9. The device of claim 6, wherein the locking section includes a pair of locking tabs that are connected to the pair of lower frame arms, each of the pair of locking tabs being configured to independently rotate relative to the lower frame arms.

10. The device of claim 9, wherein each of the locking tabs include a protrusion that extends outward from the pair of lower frame arms in a perpendicular orientation, said protrusions being configured to engage a bottom edge of a handle on the back wall of the refuse container.

11. The device of claim 1, wherein in the folded position, each of the pair of articulating frame arms are positioned adjacent to and parallel with the lower frame arms, and in the unfolded position, each of the pair of articulating frame arms are positioned perpendicular to the upper frame arms and the lower frame arms.

* * * * *